United States Patent
Bruno et al.

(10) Patent No.: US 8,662,445 B2
(45) Date of Patent: Mar. 4, 2014

(54) HYBRID POWER SYSTEM ARCHITECTURE FOR AN AIRCRAFT

(71) Applicant: Hamilton Sundstrand Corporation, Windsor Locks, CT (US)

(72) Inventors: Louis J. Bruno, Ellington, CT (US); Anthony C. Jones, San Diego, CA (US); Todd A. Spierling, Byron, IL (US); Gregory L. DeFrancesco, Simsbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/953,164

(22) Filed: Jul. 29, 2013

(65) Prior Publication Data

US 2013/0306790 A1    Nov. 21, 2013

Related U.S. Application Data

(62) Division of application No. 13/207,023, filed on Aug. 10, 2011, now Pat. No. 8,500,064.

(51) Int. Cl.
*B64D 13/08* (2006.01)
*B64C 13/40* (2006.01)
*B64D 41/00* (2006.01)

(52) U.S. Cl.
USPC ............... 244/118.5; 244/99.6; 244/53 A

(58) Field of Classification Search
USPC ........... 244/53 A, 118.5, 58, 60, 117 A, 99.6, 244/99.2; 60/785; 165/235; 62/172
See application file for complete search history.

(56) References Cited

U.S. PATENT DOCUMENTS

| 4,684,081 | A | * | 8/1987 | Cronin ................. 244/53 A |
| 5,100,082 | A |   | 3/1992 | Archung |
| 6,636,786 | B2 |  | 10/2003 | Partel |
| 7,210,653 | B2 |  | 5/2007 | Atkey et al. |
| 7,624,592 | B2 | * | 12/2009 | Lui et al. ................. 62/402 |
| 2009/0326737 | A1 | * | 12/2009 | Derouineau et al. .......... 701/3 |
| 2010/0170262 | A1 | * | 7/2010 | Kaslusky et al. ............. 60/785 |

FOREIGN PATENT DOCUMENTS

WO    WO 2009068265 A1 *   6/2009

* cited by examiner

*Primary Examiner* — Tien Dinh
*Assistant Examiner* — Richard R Green
(74) *Attorney, Agent, or Firm* — Kinney & Lange, P.A.

(57) ABSTRACT

A hybrid power distribution system for an aircraft generates hydraulic power from one of a plurality of power sources based on which power source provides energy most efficiently. Power sources includes an electric power distribution bus that distributes electrical energy onboard the aircraft, a pneumatic distribution channel that distributes pneumatic energy onboard the aircraft, and mechanical power provided by one or more engines associated with the aircraft.

5 Claims, 1 Drawing Sheet

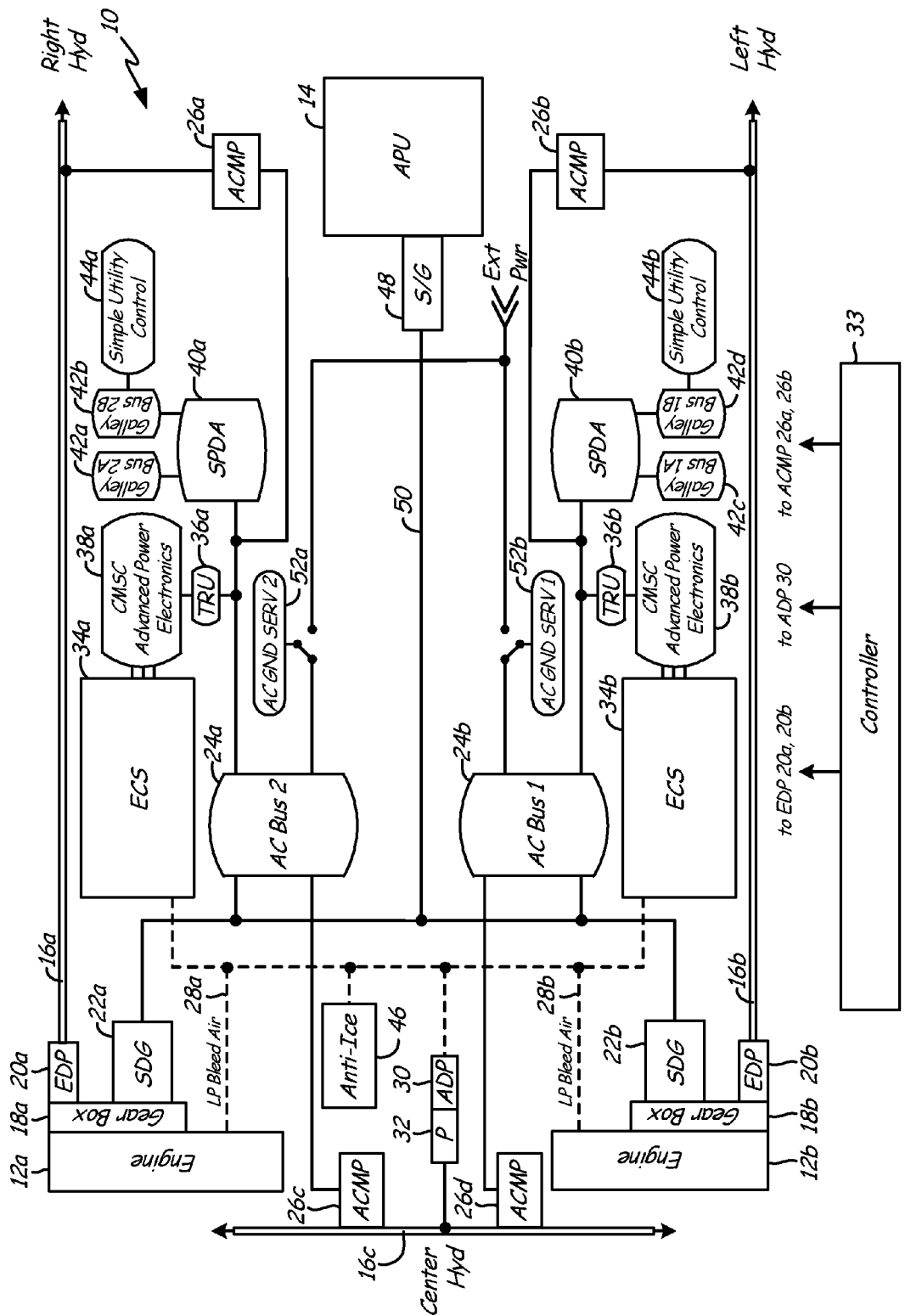

HYBRID POWER SYSTEM ARCHITECTURE FOR AN AIRCRAFT

CROSS-REFERENCE TO RELATED APPLICATIONS

This application is a divisional of U.S. patent application Ser. No. 13/207,023 filed Aug. 10, 2011, entitled "Hybrid Power System Architecture for an Aircraft".

BACKGROUND

The present invention is related to power system architectures and in particular to pneumatic and electric power system architectures employed in aircraft.

Power distribution systems in aircraft operate to transfer energy from one part of the aircraft to another. Power can be distributed in various forms, including hydraulically, pneumatically, and electrically. Traditionally, there is little interaction between these systems. For example, the hydraulic distribution system does not interact with the electrical distribution system or the pneumatic distribution system. For example, one type of aircraft may rely mostly on pneumatic systems that distribute bleed air (e.g., compressed air generated by the aircraft engines) to various systems throughout the aircraft. For example, pneumatic power provided by an auxiliary power unit (APU) can be used to start a main aircraft engine. Pneumatic power provided by the main engine can be used to spin turbine and/or compressors associated with environmental control systems on the aircraft. However, the extraction of bleed air from the engine reduces the overall efficiency of the engine, particularly during certain flight segments. Furthermore, the distribution of pneumatic power requires large amounts of piping which increases the cost and weight of the aircraft, thereby further decreasing efficiency.

An alternative to pneumatic power is electrical power, which is generated by converting the rotational, mechanical energy associated with the aircraft engines and/or APU to electrical energy that is distributed throughout the aircraft. Instead of supplying pneumatic power to spin turbines and/or compressors associated with the environmental control systems, electrical energy is distributed to motors which in turn spin the turbines and/or compressors associated with the environmental control systems. However, torque generated by the electrical generator also contributes to decreased efficiency of the aircraft engine, particularly during certain flight segments.

SUMMARY

A hybrid power distribution system includes a plurality of power sources connected to supply energy to a hydraulic distribution channel that provides power to hydraulic loads on the aircraft. The plurality of power sources includes at least two of an electric power distribution bus that distributes electrical energy onboard the aircraft, a pneumatic distribution channel that distributes pneumatic energy onboard the aircraft, and mechanical energy derived from the aircraft engine. In particular, an engine driven pump converts mechanical energy provided by an at least one aircraft engine to hydraulic energy in the hydraulic distribution channel. An alternating current (AC) motor pump converts electrical energy provided by the electrical power distribution bus to hydraulic energy in the hydraulic distribution channel, and an air driven pump converts pneumatic energy provided by the pneumatic distribution channel to hydraulic energy in the hydraulic distribution channel. The engine driven pump, the AC motor pump, and the air driven pump are selectively operated based on operating conditions of the aircraft to efficiently supply energy to the hydraulic distribution circuit.

BRIEF DESCRIPTION OF THE DRAWINGS

The figure a single-line diagram illustrating the hybrid pneumatic and electric power system according to an embodiment of the present invention.

DETAILED DESCRIPTION

The hybrid pneumatic and electric power distribution system of the present invention provides an architecture that efficiently utilizes aircraft energy. Hydraulic power used to drive flight control systems is sourced for one of a plurality of different power distribution systems, such as mechanical systems (e.g., gearbox), electrical systems, or pneumatic systems depending on which is most efficient during a particular flight segment. In addition, the system makes efficient use of low-pressure bleed air to pressurize the cabin and for supply to environmental control systems and electric distribution systems to heat/cool the airflow provided by the low-pressure pneumatic system.

The figure is a single-line diagram illustrating hybrid power system 10 according to an embodiment of the present invention. For purposes of this illustration, electric power distribution systems are illustrated in solid lines, pneumatic power distribution systems are illustrated in dashed lines, and hydraulic power distribution systems are illustrated in double lines. During flight, most of the power made available to the aircraft for distribution and consumption is derived from mechanical energy associated with the engines. In the embodiment shown in the figure, the aircraft includes first engine 12a, second engine 12b and auxiliary power unit (APU) 14. Mechanical energy provided by engines 12a, 12b and APU 14 can be converted to pneumatic, hydraulic or electrical power for distribution around the aircraft and eventual consumption by one or more loads. Hydraulic power is typically employed to drive flight actuation systems such as ailerons. One aspect of the power distribution architecture of the present invention is that either mechanical, pneumatic, or electric power can be used to supply energy to hydraulic power distribution systems on-board the aircraft. During different flight segments, different power sources may be more efficient than others. A benefit of the power distribution architecture of the present invention is the most efficient power source can be selected at different stages of flight.

In the embodiment shown in the figure, hybrid power system 10 includes right hydraulic power distribution channel 16a, left hydraulic power distribution channel 16b, and center hydraulic power distribution channel 16c. Hydraulic power distribution channels are typically employed to drive flight control systems (e.g., ailerons, other flight control surfaces). In the embodiment shown in the figure, power is distributed to right and left hydraulic power distribution channels 16a, 16b from one of two different sources, and center hydraulic power distribution channel 16c is sourced from one or two different sources. In other embodiments, each hydraulic distribution channel may be connected to receive power from all available power sources (e.g., electrical, pneumatic, and mechanical power available on an aircraft).

With respect to the right and left hydraulic power distribution channels 16a, 16b, the first source is mechanical energy provided by engines 12a, 12b via gearboxes 18a, 18b and engine-drive pumps (EDPs) 20a, 20b, which convert mechanical energy to hydraulic energy for distribution by the respective hydraulic power distribution channels 16a, 16b. In this way, mechanical energy provided by engines 12a, 12b is converted to hydraulic energy by EDPs 20a, 20b. The second source is electric energy provided by starter drive/generators (SDGs) 22a, 22b, which convert mechanical energy provided by engines 12a, 12b respectively to electrical energy for distribution via electrical distribution bus 24a, 24b. In the embodiment shown in the figure, alternating current motor pump (ACMP) 26a, 26b converts electric energy provided by electrical distribution bus 24a, 24b to hydraulic energy for distribution via hydraulic power distribution channels 16a, 16b.

With respect to the center hydraulic power distribution channel 16c, the first source is electrical energy provided via electrical distribution buses 24a, 24b to ACMPs 26c and 26d, respectively, for conversion to hydraulic energy for distribution via center hydraulic distribution channel 16c. In addition, center hydraulic distribution channel 16c receives pneumatic power provided via low-pressure bleed air extracted from engines 12a, 12b via pneumatic distribution channels 28a, 28b and converted to hydraulic power by air driven pump (ADP) 30 and hydraulic pump 32. That is, ADP 30 and hydraulic pump 32 act to convert pneumatic airflow to hydraulic power for distribution via hydraulic power distribution channel 16c.

Depending on the particular flight segment (e.g., takeoff, climbing, cruising, descending, landing, etc.) different power sources can be used to provide the required energy to left, right, and center hydraulic power distribution channels 16a, 16b, and 16c. For example, during take-off it may be more efficient to source the right and left hydraulic power distribution channels from mechanical energy provided by the engines via EDPs 20a, 20b. During cruise, however, it may be more efficient to source the right and left hydraulic power distribution channels from electric energy provided via electric distribution buses 24a, 24b and ACMPs 26a, 26b Likewise, with respect to center hydraulic distribution channel 16c, during one part of the flight segment it may be more efficient to source the hydraulic power distribution channel from electric energy provided via electric distribution buses 24a, 24b and ACMPs 26c, 26d. During a different part of the flight segment (e.g., during climb and descent operations), it may be more efficient to source the hydraulic power distribution channel with pneumatic power provided from pneumatic distribution channels 28a, 28b and ADP 30. In this way, the present invention employs the most efficient means available to distribute power to the hydraulic power distribution channels 16a, 16b, 16c. The decision regarding which power source to utilize during different portions of the flight segment may be based on information provided by a Flight Management Computer, or some other central controller. In other embodiments, the decision may be based on input provided by a central load management controller which compares power made available from the various sources with the power being demanded by various loads.

In one embodiment, controller 33 monitors flight conditions of the aircraft and determines which power source will provide the most efficient supply of power to hydraulic power distribution channels 16a, 16b, 16c. In the embodiment shown in the figure, controller 33 provides inputs to EDP 20a, 20b, ADP 30 and ACMPs 26a, 26b to selectively determine which power source provides power to hydraulic distribution channels 16a, 16b, and 16c. For example, during taxiing operations, it may be more efficient to supply energy to the hydraulic power distribution channel from mechanical energy provided by the engine.

Should one of the power sources used to source right, left, or center hydraulic distribution channels 16a, 16b, 16c fail, an alternative power source is available to source the hydraulic distribution channels, even if somewhat more inefficiently than the desired power source.

In addition, in the embodiment shown in the figure, environmental control systems (ECSs) 34a and 34b are hybrid systems connected to receive both electric power and pneumatic power. With respect to ECS 34a, electric energy is distributed via electric distribution power bus 24a, transformer/rectifier unit (TRU) 36a, and selectively supplied to ECS 34a via common mode starter controller (CMSC) 38a. TRU 36a converts AC electric power to direct current (DC) electric power. CMSC 38a includes a plurality of motor controllers, which typically convert DC power provided by TRU 36a to AC power having a desired frequency for supply to various motors included as part of ECS 34a. With respect to ECS 34b, electric energy is similarly distributed via AC power bus 24b, TRU 36b, and CMSC 38b.

In addition to electrical energy, pneumatic airflow is provided to ECSs 34a, 34b, from engines 12a and 12b, respectively. In the embodiment shown in the figure, the pneumatic airflow provided to ECS 34a via pneumatic distribution path 28a is low-pressure pneumatics. This is in contrast with high-pressure pneumatics employed to drive pneumatic motors. Thus, the pneumatic airflow provided to ECS 34a via pneumatic distribution path 28a does not provide power, but rather provides the airflow that is operated on by ECS 34a. For example, ECS 34a may include a vapor cycle and/or electric heater driven by CMSC 38a for cooling and/or heating, respectively, the low-pressure pneumatic airflow supplied via pneumatic distribution path 28a for provision to the cabin.

A benefit of employing low-pressure bleed air from the engine for supply ECSs 34a and 34b is that it does not require electric-driven compressors to compress air for provision to ECSs 34a and 34b. Although bleed air does decrease the efficiency of the engines 12a, 12b, employing low-pressure bleed air for supply to ECSs 34a, 34b is more efficient during some flight stages than using electric energy to drive compressors to supply compressed air to ECSs 34a and 34b.

However, in one embodiment ECSs 34a, 34b include electric-driven fans for supplying ambient air to temperature control components when no low-pressure bleed air is available via the pneumatic distribution channel. CMSCs 38a, 38b provide the electric energy necessary to drive the electric-driven fans included within ECSs 34a, 34b. For example, while on the ground prior to starting engines 12a, 12b, electric power provided by CMSCs 38a, 38b are used to drive electric-driven fans within ECSs 34a, 34b to supply the ambient air required by ECSs 34a, 34b (e.g., to supply cooling air to temperature control components). In addition, during various flight stages it may be desirable to use electric energy to provide the desired ambient air rather than extract low-pressure bleed air from engines 12a, 12b.

In addition, electric power provided via electric distribution buses 24a, 24b is distributed to electric loads via secondary power distribution assembly (SPDA) 40a, 40b. Examples of electric loads include galley bus loads 42a and 42b associated with SPDS 40a and simple utility control 44a. Low-pressure bleed air supplied via pneumatic distribution paths 28a, 28b are also provided to anti-ice device 46 for de-icing operations.

In addition, APU 14 can be operated in a generating mode via starter/generator (S/G) 48 to provide electric power onto electric power distribution bus 50, which is connected to SDGs 22a, 22b. In this way, power derived from APU 14 and communicated electrically via electric power bus 50 can be converted to mechanical energy by SDGs 22a, 22b (operating in a motoring mode) to start engines 12a, 12b. This obviates the need for pneumatic plumbing to be included between APU 14 and engines 12a, 12b for pneumatic starting of the engines. In addition, electric power may be provided to electric power distribution bus 50 from AC ground sources 52a, 52b via AC power buses 24a, 24b, respectively. When on the ground, electric power supplied from the ground can be converted by SDGs 22a, 22b to provide the mechanical energy necessary to start the engines 12a, 12b, respectively. Once again, this obviates the need for pneumatic plumbing to be provided to engines 12a, 12b, and also obviates the need for ground crews to include vehicles for providing pneumatic power to engines 12a, 12b.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hybrid power distribution system for use in an aircraft having at least one engine, the hybrid power distribution system comprising:
   a starter drive/generator that converts mechanical energy provided by the at least one engine to electrical energy for distribution via an electrical power distribution bus;
   a pneumatic distribution channel for extracting low-pressure bleed air from the at least one engine;
   an environmental control system (ECS) connected to receive low-pressure bleed air from the pneumatic distribution channel, wherein the ECS includes temperature control components supplied with power from the electrical power distribution bus to provide cooling and heating to the low-pressure bleed air provided from the pneumatic distribution channel;
   a hydraulic distribution channel for providing hydraulic power to loads on the aircraft;
   an engine-driven pump connected to convert mechanical energy provided by the at least one engine to hydraulic energy in the hydraulic distribution channel;
   an electric-driven motor pump for converting electric energy provided by the electrical distribution bus to hydraulic energy for distribution by the hydraulic distribution circuit; and
   an air-driven pump for converting pneumatic energy provided by the pneumatic distribution circuit to hydraulic energy for distribution by the hydraulic distribution circuit, wherein hydraulic power is generated in the hydraulic distribution circuit by one of the engine-driven pump, the electric-driven motor pump, and air-driven pump during various flight segments based on which supplies the hydraulic power most efficiently.

2. The hybrid power distribution system of claim 1, further including:
   an auxiliary power unit (APU) that includes a starter/generator for converting mechanical energy provided by the APU to electrical energy for supply to the electrical distribution bus, wherein the electrical energy provided by the starter/generator of the APU is supplied to the starter drive/generator for conversion to mechanical power for starting the at least one engine without pneumatic energy being supplied to aid in starting of the least one engine.

3. The hybrid power distribution system of claim 1, wherein the temperature control components include an electric driven vapor cycle system to provide cooling to the low-pressure bleed air provided from the pneumatic distribution circuit.

4. The hybrid power distribution system of claim 1, wherein the temperature control components include an electric heater system to provide heating to the low-pressure bleed air provided from the pneumatic distribution circuit.

5. The hybrid power distribution system of claim 1, wherein the ECS includes electric drive fans for supplying ambient air through the temperature control components when no low-pressure bleed air is available via the pneumatic distribution circuit.

* * * * *